United States Patent Office 2,847,341
Patented Aug. 12, 1958

2,847,341

ETHOXYLINE RESIN COMPOSITIONS AND THEIR PREPARATION

Leo S. Kohn, Schenectady, N. Y., assignor to General Electric Company, a corporation of New York No Drawing. Application March 7, 1957
Serial No. 644,447

5 Claims. (Cl. 154—140)

This invention relates to new and useful resin compositions. More particularly the invention relates to resin compositions having desirable physical, chemical and electrical properties, including long pot life and flexibility at elevated temperatures.

Epoxy, epoxide or ethoxyline resins, as they are variously called, are well known in the art. Generally, such epoxy resins comprise a polyether derivative of a polyhydric organic compound, said derivative containing 1, 2 epoxy groups, said compound being selected from the class consisting of polyhydric alcohols and phenols containing at least two phenolic hydroxy groups. For example, U. S. Patent 2,324,483 to Castan discloses epoxy resin compositions comprising the reaction product of phenols having at least two phenolic hydroxy groups and an epihalogenohydrin such as epichlorohydrin, the product having at least two epoxy groups and being cured to a thermoset infusible mass by the use of a carboxylic or polybasic acid or acid anhydride such as phthalic anhydride. The use of organic nitrogen base or amine type materials to cure epoxy resins is also well known as set forth, for example, in Patent 2,444,333, such materials often giving a rapid cure at room temperature. Generally, however, the pot life of amine cured epoxy resins is comparatively short and their high temperature characteristics are often poor. According to copending application, Serial No. 401,045, filed December 29, 1953, now abandoned and succeeded by continuation-in-part application Serial No. 691,173, filed October 21, 1957, and assigned to the same assignee as this invention, it is proposed that an organic titanium material be used along with an amine as a curing agent to obtain a resinous mass having desirable hardness, brittleness and toughness at elevated temperatures. Such materials are very useful in many applications. However, there are certain applications in which it is desirable that a resin used as an adhesive, filler, coating etc. in conjunction with other structures, such as wire arrays, laminates, etc. which expand or move at elevated temperatures, become rubbery or flexible at such temperatures to prevent the disruptive high temperature forces from tearing the structure apart. Thus, in the stator coils of electro-dynamic machines, the conductor bars of which are insulated with a resinous material, it is desirable that at high operating temperatures of the order of 80° C. and above the insulating resin be rubbery and flexible so that it will conform to the expansion and warping of the conducting bar assemblies. By this is not meant simply heat distortion of the resin which is permanent, but an ability to yield under high temperature produced stresses and to substantially recover therefrom upon release of the stress when the temperature is lowered.

A principal object of this invention is to provide new epoxy resin compositions which have desirable physical, chemical and electrical characteristics including low power factor, long pot life and the ability even though rigid at ordinary temperatures of becoming rubbery and flexible at elevated temperatures.

Briefly, the invention comprises epoxy resin compositions having as curing agent organic titanium ester material and a lactam or mixture of lactams, the cured resin having desirable qualities including flexibility at high temperature and rigidity at ordinary temperatures. For each 100 parts by weight of epoxy resin, from 3 to 20 parts by weight of the lactam compound are used, and preferably 5 to 10 parts by weight, while the organic titanium ester is used in the amount of 2 to 10 parts by weight, and preferably 3 to 5 parts by weight. The epoxy resin used preferably has an epoxide equivalent of 175 to 375 and most preferably from 175 to 210.

The ethoxyline resins used in conjunction with my invention are, as pointed out above, well known in the art. They are described in Castan U. S. Patent Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2-propane. U. S. Patent Nos. 2,494,295, 2,500,600 and 2,511,913 describe further ethoxyline resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example bis-(4-hydroxy phenyl)-2,2-propane with epichlorohydrin. The reaction of epichlorohydrin with bis-(4-hydroxy phenyl)-2,2-propane is as follows:

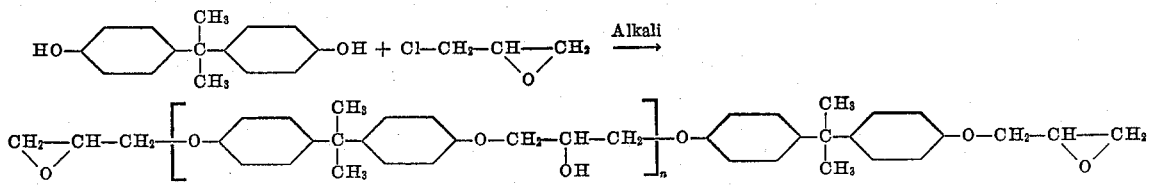

where $n$ has an average value ranging from 0 to about 7. Such ethoxyline resins are sold under the name of Epon by Shell Chemical Corporation, under the name Araldite by the Ciba Company, as Epi-Rez by Devoe-Raynolds Company and as ERL resins by the Bakelite Company. The data given below for such resins is representative.

TABLE I

| Epoxy Resin | Epoxide Equivalent | M. P., ° C. |
|---|---|---|
| Epon 828 | 192 | 9 |
| Epon 834 | 225–290 | 20–28 |
| Epon 1064 | 300–375 | 40–45 |
| Araldite 6010 | 192 | Liquid |
| Araldite 6020 | 200–205 | Liquid |
| ERL 2774 | 175–200 | Liquid |
| Epi-Rez 510 | 175–200 | Liquid |

The lactams useful in connection with the invention include pyrrolidone, piperidone and ε-caprolactam, among others. In general, any compound having the well-known lactam group and no other constituent reactive with epoxy resins is useful. Thus, morpholone containing an oxygen atom in the ring is useful, as are compounds containing a sulphur atom. Mixtures of lactams can also be used, and the term lactam, as used herein, includes mixtures of such materials. It has been found that a lactam material used alone is not an efficacious curing agent for epoxy resins. When 15 parts by weight of ε-caprolactam were added to 100 parts by weight of Araldite 6020 and the mixture heated at 135° C. to 150° C., no appreciable curing action had taken place after more than 72 hours of such heating.

The organic esters of titanium, which have been found useful in connection with the invention, correspond to the general formula

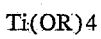

Ti(OR)4 wherein R is a radical selected from the group consisting of the saturated and unsaturated aliphatic hydrocarbon radicals, for example methyl, ethyl, etc. and vinyl, alkyl, etc., aryl, aralkyl, alkaryl and cycloaliphatic radicals. Specific examples of esters of ortho titanic acids which may be employed include those substituted by methyl, ethyl, propyl, isopropyl, n-butyl, isobutyl, secondary butyl, tertiary butyl, etc. radicals, vinyl, allyl, butenyl radicals, etc., phenyl, naphthyl, benzyl, cinnamyl and substituted phenyl or naphthyl, tolyl, xylyl and phenylethyl radicals, various cycloaliphatic esters such as tetracyclohexyl. These compounds may comprise, in addition, mixed esters having two or more different radicals of the group enumerated. It will be understood, of course, that mixtures of such titanates can be used and the term titanate, organic titanium ester material or organic titanium ester will be understood to include mixtures thereof.

When organic titanate ester was used alone to cure an epoxy resin, the curing time was excessively long, thus eliminating the use of titanium esters alone as a commercially feasible or practical curing agent for epoxy resins. For example, when 6 parts by weight of tetrabutyl titanate and 100 parts by weight of Araldite 6020 were heated together for 16 hours at 135° C., only a slight increase in viscosity was noted.

It has been unexpectedly found, however, that when the two types of materials mentioned above, namely lactams and organic titanium esters, are combined in certain proportions with epoxy resins, the latter is cured quickly in spite of the slow or incomplete cures obtained with titanates alone or with lactams alone, and while such materials are rigid at room temperature, as would be expected, they are rubbery and flexible at high temperatures. The materials also have a pot life of generally over four months at room temperature. I have found that epoxy resins having an epoxy equivalent of 175 to 375, and preferably from 175 to 210, are most useful in preparing epoxy resin compositions according to this invention. Epoxy resins having an epoxide equivalent of over 375 contain so many reactive hydroxyl groups that the curing reaction is very rapid, resulting in a hard, rigid product in about one-half minute when heated at 135° C. to 150° C. The pot life of the present compositions lessens as the epoxy equivalent of the resin increases.

The lactams and organic titanate curing agents can be added to the epoxy resin in any desired sequence. For example, the lactam and titanium ester can be mixed together and added to the epoxy and heated. Alternatively, the epoxy resin and organic titanium ester can be heated together and the lactam added thereto. Likewise, titanium ester and the lactam can be added together to the epoxy and then heated, or the lactam and the epoxy resin can be mixed together and heated and the titanium ester added to this mixture. The ingredients can be heated in an open vessel or under reduced pressure. In general, heating for about one hour at 135° C. is sufficient to completely dissolve the solid ingredients to a homogeneous mixture. Of course, no heating is required to dissolve liquids such as pyrrolidone.

The following examples are illustrative of the practice of the invention, all parts being by weight. Varying amounts of ingredients as shown in Table II were mixed in a vacuum vessel equipped with thermometer and stirrer, the pressure being maintained at about 10 mm. of mercury. For each example shown, the ingredients shown in the first line of the example were heated together for about one hour at 135° C. to obtain a homogeneous mixture. Then the rest of the curing agents shown was added and the material further heated for 16 hours at 135° C. to obtain the material which was rigid at room temperature and rubbery and flexible at about 80° C. and above. Power factor measurements were made at 130° C. and 10 volts per mil using 200 mil thick discs which had been cured for a total of 20 hours at 135° C. before testing.

TABLE II

| Ex. | Ingredients | Power Factor (Percent) |
|---|---|---|
| 1 | 100 parts Araldite 6010 plus 3 parts TBT*<br>10 parts ε-caprolactam | 3.08 |
| 2 | 100 parts Araldite 6010 plus 1 part TBT<br>2 parts TBT<br>10 parts ε-caprolactam | 1.1 |
| 3 | 100 parts Araldite 6010 plus 3 parts TBT<br>2 parts TBT<br>10 parts ε-caprolactam | 16.4 |
| 4 | 100 parts Araldite 6010 plus 1 part TBT<br>4 parts TBT<br>10 parts ε-caprolactam | 62.6 |
| 5 | 100 parts Araldite 6010 plus 5 parts TOT*<br>10 parts ε-caprolactam | 0.2 |
| 6 | 100 parts Araldite 6010 plus 5 parts TPT*<br>10 parts ε-caprolactam | NM |
| 7 | 100 parts Araldite 6010 plus 5 parts TBT<br>10 parts ε-caprolactam | 1.6 |
| 8 | 100 parts Araldite 6010<br>5 parts TBT<br>10 parts ε-caprolactam | 5.5 |
| 9 | 100 parts Araldite 6010 plus 3 parts TPT<br>2 parts TBT<br>10 parts ε-caprolactam | 4.8 |
| 10 | 100 parts Araldite 6010 plus 3 parts TPT<br>10 parts ε-caprolactam | 2.3 |
| 11 | 100 parts Araldite 6010 plus 5 parts TOT<br>5 parts ε-caprolactam | 10.3 |
| 12 | 100 parts Araldite 6010 plus 5 parts TPT<br>5 parts ε-caprolactam | NM |
| 13 | 100 parts Araldite 6010 plus 3 parts TPT<br>5 parts ε-caprolactam | 2.87 |
| 14 | 100 parts Araldite 6010 plus 5 parts TPT<br>10 parts 2-pyrrolidone | 6.4 |
| 15 | 100 parts Araldite 6010<br>5 parts TBT<br>10 parts 2-pyrrolidone | 22.0 |
| 16 | 100 parts Araldite 6010 plus 3 parts TBT<br>10 parts 2-pyrrolidone | 3.4 |
| 17 | 100 parts Araldite 6010 plus 5 parts TPT<br>10 parts 2-pyrrolidone | NM |
| 18 | 100 parts Araldite 6010 plus 5 parts TOT<br>10 parts 2-pyrrolidone | 1.5 |
| 19 | 100 parts Araldite 6010 plus 3 parts TPT<br>10 parts 2-pyrrolidone | 12.0 |
| 20 | 100 parts Araldite 6010 plus 1 part TPT<br>4 parts TBT<br>5 parts 2-pyrrolidone | NM |
| 21 | 100 parts Araldite 6010 plus 3 parts TPT<br>2 parts TBT<br>5 parts 2-pyrrolidone | NM |
| 22 | 100 parts Araldite 6010 plus 1 part TBT<br>2 parts TBT<br>5 parts 2-pyrrolidone | 6.0 |
| 23 | 100 parts Araldite 6010 plus 5 parts TBT<br>5 parts 2-pyrrolidone | 2.6 |
| 24 | 100 parts Araldite 6010 plus 5 parts TPT<br>5 parts 2-pyrrolidone | NM |
| 25 | 100 parts Araldite 6010 plus 5 parts TOT<br>5 parts 2-pyrrolidone | 2.7 |
| 26 | 100 parts Araldite 6010 plus 3 parts TPT<br>5 parts 2-pyrrolidone | 1.4 |
| 27 | 100 parts Araldite 6010<br>5 parts TBT<br>6 parts 2-pyrrolidone | 1.6 |
| 28 | 100 parts Araldite 6010 plus 5 parts TBT<br>6 parts 2-pyrrolidone | .2 |
| 29 | 100 parts Araldite 6010 plus 5 parts TBT<br>3 parts 2-pyrrolidone | 2.3 |
| 30 | 100 parts Araldite 6010 plus 3 parts TPT<br>2 parts TBT<br>5 parts 2-pyrrolidone | less than 1. |
| 31 | 100 parts Araldite 6010 plus 5 parts TPT<br>3 parts 2-pyrrolidone | 3.7 |
| 32 | 100 parts Araldite 6010 plus 5 parts TBT<br>6 parts 2-pyrrolidone | 0.2 |
| 33 | 100 parts Epon 834<br>5 parts TBT<br>5 parts 2-pyrrolidone | 1.7 |
| 34 | 100 parts Epon 834 plus 5 parts TBT<br>5 parts 2-pyrrolidone | 0.5 |
| 35 | 100 parts Epon 834 plus 5 parts TBT<br>10 parts ε-caprolactam | 0.25 |

*TBT—tetrabutyltitanate; TPT—tetraisopropyltitanate; TOT—tetra(2-ethylhexyl)titanate.
NM—not measured.

Example 36

To 100 parts of Araldite 6020 there was added with mixing 5 parts of tertiarybutyltitanate and 10 parts of ε-caprolactam, the material being cured for 16 hours at 135° C. with no preliminary cook to give a material which was rubbery and flexible at a temperature of about 135° C. The power factor measured as above was 5.5%.

Example 37

To 200 parts of Araldite 6020 there was added 10 parts of tertiarybutyltitanate and 20 parts of ε-caprolactam. The material was heated with stirring at 110° C. for 1.5 hours at which point the material thickened. With further heating for 1.5 hours, the material became a soft, tack-free solid at room temperature and a viscous liquid at 110° C. Subsequent heating of this material for 16 hours at 135° C gave a material which was hard and rigid at room temperature and tough and flexible at temperatures above 100° C.

The epoxy resin compositions of this invention have many uses. They can be used as potting compounds, and for molding purposes. When dissolved in suitable well-known solvents they can be used as impregnants for fibrous materials and adhesives or binders for laminates and for other purposes. They can also be used as coating materials for wires or electrical conductors. They may be filled with the usual fillers in varying amounts to give compositions tailored to suit any particular needs and can be prepared as B-stage resins.

While I have pointed out epoxy resin compositions containing certain preferred amounts of lactam and organic titanium ester which are rigid at ordinary temperatures and rubbery and flexible at elevated temperatures, it will be realized that other proportions of titanate and lactam can be used if such specific characteristics are not required or desired.

What I claim as new and desire to secure by Letters Patent of the United States is:

1. A composition of matter comprising the heat reaction product of (1) 100 parts by weight of a complex epoxide resin having an epoxide equivalent of from 175 to 375, containing 1, 2 epoxide groups and comprising a polyether derivative of a polyhydric organic compound selected from a class consisting of polyhydric alcohols and phenols having at least two phenolic hydroxyl groups, (2) from 3 to 20 parts by weight of lactam and (3) from 2 to 10 parts by weight of organic titanium ester.

2. A composition of matter comprising the heat reaction product of (1) 100 parts by weight of a complex epoxide resin having an epoxide equivalent of from 175 to 375, containing 1, 2 epoxide groups and comprising a polyether derivative of a polyhydric organic compound selected from the class consisting of polyhydric alcohols and phenols having at least two phenolic hydroxyl groups, (2) from 5 to 10 parts by weight of lactam and (3) from 3 to 5 parts by weight of organic titanium ester.

3. A laminated structure comprising laminae coated and impregnated with a composition of matter comprising the heat reaction product of (1) 100 parts by weight of a complex epoxide resin having an epoxide equivalent of from 175 to 375, containing 1, 2 epoxide groups and comprising a polyether derivative of a polyhydric organic compound selected from the class consisting of polyhydric alcohols and phenols having at least two phenolic hydroxyl groups, (2) from about 3 to 20 parts by weight of lactam and (3) from about 2 to 10 parts by weight of organic titanium ester.

4. An electrical conductor coated with a composition of matter comprising the heat reaction product of (1) 100 parts by weight of a complex epoxide resin having an epoxide equivalent of from 175 to 375, containing 1, 2 epoxide groups and comprising a polyether derivative of a polyhydric organic compound selected from the class consisting of polyhydric alcohols and phenols having at least two phenolic hydroxyl groups, (2) from 3 to 20 parts by weight of lactam and (3) from 2 to 10 parts by weight of organic titanium ester.

5. The process of curing an epoxide resin having an epoxide equivalent of from 175 to 375, containing 1, 2 epoxide groups and comprising a polyether derivative of a polyhydric organic compound selected from the class consisting of polyhydric alcohols and phenols having at least two phenolic hydroxyl groups, which comprises adding to each 100 parts by weight of said epoxide resin from 3 to 20 parts by weight of lactam and from 2 to 10 parts by weight of organic titanium ester and heating.

References Cited in the file of this patent

UNITED STATES PATENTS

| | | |
|---|---|---|
| 2,614,112 | Boyd | Oct. 14, 1952 |
| 2,707,708 | Wittcoff | May 3, 1955 |

OTHER REFERENCES

Dunn: "Rubber and Plastics Age" (1954), volume 35, pp. 84–87.

Schildknecht: Polymer Processes, volume X, pp. 239–243 (1956).